United States Patent
Koolen et al.

(10) Patent No.: US 8,593,772 B2
(45) Date of Patent: Nov. 26, 2013

(54) SURGE PROTECTION CIRCUIT

(75) Inventors: Gert-Jan Koolen, Aarle Rixtel (NL);
Peter Hubertus Franciscus Deurenberg, s-Hertogenbosch (NL);
Wilhelmus Hinderikus Maria Langeslag, Wijchen (NL)

(73) Assignee: NXP, B.V., Eindhoven (NL)

( * ) Notice: Subject to any disclaimer, the term of this patent is extended or adjusted under 35 U.S.C. 154(b) by 336 days.

(21) Appl. No.: 13/059,172

(22) PCT Filed: Aug. 6, 2009

(86) PCT No.: PCT/IB2009/053436
§ 371 (c)(1),
(2), (4) Date: Feb. 15, 2011

(87) PCT Pub. No.: WO2010/020898
PCT Pub. Date: Feb. 25, 2010

(65) Prior Publication Data
US 2011/0149444 A1 Jun. 23, 2011

(30) Foreign Application Priority Data
Aug. 19, 2008 (EP) .................................. 08105075

(51) Int. Cl.
*H02H 3/20* (2006.01)
(52) U.S. Cl.
USPC ........................................ 361/91.1; 361/111
(58) Field of Classification Search
USPC .................................. 361/91.1, 111
See application file for complete search history.

(56) References Cited

U.S. PATENT DOCUMENTS

| 4,533,970 | A | | 8/1985 | Brown | |
|---|---|---|---|---|---|
| 5,806,522 | A | * | 9/1998 | Katims | ..................... 600/554 |
| 7,038,430 | B2 | * | 5/2006 | Itabashi et al. | ................ 323/224 |
| 7,443,014 | B2 | * | 10/2008 | Otremba | ..................... 257/676 |
| 2006/0083031 | A1 | * | 4/2006 | Cook | ........................ 363/20 |

FOREIGN PATENT DOCUMENTS

| DE | 19926109 A1 | | 12/2000 |
|---|---|---|---|
| DE | 10 2004 036 164 | * | 3/2006 |
| EP | 0497478 A2 | | 8/1992 |
| FR | 2619262 A1 | | 2/1989 |
| FR | 2712747 A1 | | 5/1995 |
| WO | 8602786 | | 5/1986 |
| WO | 9501667 | | 1/1995 |
| WO | 2008060469 A2 | | 5/2008 |

* cited by examiner

*Primary Examiner* — Rexford Barnie
*Assistant Examiner* — Tien Mai (57) ABSTRACT

A surge protection circuit is disclosed for an electrical Load which may be for instance an LED load which is directly connected to a supply such as mains supply, and comprises a plurality of switches which are distributed across a plurality of semiconductor die. A surge detector detects the start of a spike in the supply, which results from, for example the commencement or interruption of a nearby inductive load, and opens all the switches. By distributing the switches across multiple die the peak voltage across each is reduced relative to using a single die; thereby each die can stay within the absolute maximum voltage capacity. Each die may have its own surge detector; alternatively, a single surge detector may be used which communicates with the switches on each of the die. In an extension the bridge rectifier may be integrated into the circuit distributed across the die. In this embodiment additional inter-die clamping diodes are required to prevent unsafe floating of the edge connections of each die.

19 Claims, 6 Drawing Sheets

SURGE PROTECTION CIRCUIT

FIELD OF THE INVENTION

This invention relates to surge protection circuits. In particular, it relates to surge protection circuits for electrical loads, which are directly connected to a supply susceptible to power transients.

BACKGROUND OF THE INVENTION

An example of an electrical load which is directly connected to a supply susceptible to power transients, is a mains-driven LED circuit.

Presently the majority of mains powered LED lamps use DC/DC converters in order to adapt the high mains voltage to the low LED voltage. However, this approach is not particularly convenient, involves additional components, and is relatively complex to design, especially when applied as a retrofit to existing lamps and lamp fixtures. As a result there is an increasing interest in modifying the LED load such that it is capable of operating directly from a mains voltage. One such variable LED load is disclosed in patent application publication W02008-060469.

However, if the LED load is suitable for operating directly from the mains, then the LED drive electronics should also be driven directly from the mains supply.

A problem then arises: typical, and even high-end, integrated circuits based on silicon have a maximum allowed voltage of about 800V. In contrast, the surges on the mains can often be in the 1 to 2 kV range on top of the mains AC voltage of perhaps ±400V. The level of transients arising as a result of surges which can be expected on a mains supply are described for example in the International Electrotechnical Commission's document IEC61000-4 on Standard of Transient Immunity Requirements. Such transients arise typically when there is a sudden change in the overall load supplied by the mains supply. For instance, when an inductive load such as a conventional motor is switched on, there can be a large, short-term, back-EMF generated, which appears on the mains as a spike or transient. A similar situation arises when an inductive load is interrupted.

During a mains surge, the voltage rises to the 1 to 2 kV region within a few microseconds, after which it decays within a few tens of microseconds. Surge protection circuits are known, which typically involve an energy absorber such as a varistor or a capacitor, often combined with a resistor. Such systems are bulky and introduce additional components into the circuit, as well as increasing the costs of the circuits, and are thus undesirable.

There thus an ongoing requirement for a cost-effective solution to the problem of surge protection for electrical loads which are directly connected to a supply which is susceptible to transients.

Although the problem has been described in relation to LED loads which are directly connected to a mains supply, it will be readily appreciated that a directly analogous problem exists with other loads which are directly connected to a voltage supply, which incorporate control electronics or drive electronics which may not be compatible with a transient surge in the supply. Examples of such systems include mains voltage fan supplies with additional functionality such as the fan speed control which is dependent on temperature, relay controls running from either mains voltage or a typical control voltage of 24V, or mains timers.

Further, it will be appreciated that the LED loads to which this invention applies are not limited to crystalline semiconductor-based LEDs, but embrace LEDs based on alternative technologies, such as but not limited to OLEDs (organic LEDs), POLYLEDs (Polymer LEDs), smOLEDS (small-molecule and the like

SUMMARY OF THE INVENTION

It is an object of the present invention to provide a surge protection circuit.

In accordance with the present invention, there is provided a surge protection circuit for an electrical load directly connected to a supply susceptible to power transients operating at substantially the supply voltage, comprising a plurality of switches connected in series, being connectable in use with the load and the supply, and including a first switch on a first semiconductor die and connectable, in use, in series with the electrical load, and a second switch on a second semiconductor die, the surge protection circuit further comprising surge detection means on at least one of the first and second semiconductor die for detecting a surge in the mains supply, a first switch driver responsive to the surge detection means to open the first switch, and a second switch driver responsive to the surge detection means to open the second switch The voltage of the surge is thereby distributed across the first and second die, such that each die is less susceptible to irreparable high voltage damage.

In a preferred embodiment, the electrical load is an LED load and the supply is a mains supply. Thus the invention is particularly suited to mains-driven LED lamps directly connected to the mains without further discrete electrical components, and provides a particularly space and cost-effective solution to improving the robustness of the driver circuit therefore.

Preferably, the surge detection means comprises means to introduce hysteresis between a detection of a surge start and a detection of a surge end. Also, when a mains surge is detected in the voltage domain, opening the switches will distribute the voltage across the die, thereby reducing it below the detection level. This avoids the risk of the system bouncing between surge and not-surge states. Beneficially, the surge detection means is configured to detect a surge in voltage. This allows for simple distributed detection.

Preference the surge protection circuit comprises connection means for providing electrical connection between the first and second semiconductor die, and further comprises clamping diodes on each of the first and second semiconductor die and connected between the connection means and a substrate of the respective semiconductor die.

In one embodiment, the surge detection means comprises a first surge detector on the first semiconductor die and a second surge detector on the second semiconductor die. Preferably, then, the first switch driver is responsive to the first surge detector, and the second switch driver is responsive to the second surge detector. This negates the requirement for communication between the die, albeit at the expense of more components on each die.

Alternatively, but without limitation, the surge detection means is on the first semiconductor die, and the surge protection circuit further comprises communication means for communicating between the surge detection means and the second semiconductor die. Thus the invention encompasses the use of a single surge detector, which thus may reduce the overall complexity.

Preferably, and allowing for particularly simple design, the communication means comprises a voltage coupling and beneficially, the communication means may comprise a cascode device.

Alternatively, but without limitation, the communication means may comprise any one or more of a capacitive coupling, an optical coupling or an inductive coupling.

Preferably, the communication means is pulsed-based and comprises one or a plurality of pulses. Using a plurality of pulses is particularly beneficial, as the robustness of the surge-protection circuit against false positives or even false negatives, is thereby enhanced. Alternatively, the communication means may be level-based.

The supply may be a rectified mains supply. Alternatively, the supply may be an un-rectified mains supply, and the surge protection circuit may further comprises bridge rectification means for rectifying the mains voltage and integrated across at least the first semiconductor die and the second semiconductor die. Beneficially the bridge rectification means may comprises a full bridge rectifier on each of the first and second semiconductor die, connected in series, the full bridge rectifiers defining a first pair and a second pair of rectified terminals respectively, the second switch being connected between the second pair of rectified terminals, and the first switch being connectable, in use, in series with the load between the first pair of rectified terminals. Thus the bridge rectifier is incorporated into the surge protection circuit, with a resulting saving in space and overall component count and thereby cost.

In an arrangement which is convenient for manufacture the first switch and the second switch are MOSFETs.

Beneficially, the plurality of switches further comprises at least one further switch, on a respective at least one further semiconductor die and connectable in use between the second switch and the supply. Thus the peak voltage may be distributed across more than two die, usefully reducing the voltage across any one individual die. Preferably, the surge protection circuit then comprises bridge rectification means, wherein the bridge rectification means comprises a full bridge rectifier on the or each of the at least one further semiconductor die. Thus the full bridge rectification may be distributed across each of the three or more die.

Such a surge protection circuit may further comprise a further surge detector on each of the at least one further semiconductor die and wherein the at least one further switch is responsive to the respective further surge detector. Alternatively, the surge protection circuit may further comprise communication means for communicating between the surge detection means and the at least one further die. Thus the concepts of distributed surge detection, and single surge detection with communication means, are both applicable to embodiments with more than two die.

Viewed from one perspective, the invention is based on the insight that it is possible to distribute the voltage in a power surge across multiple semiconductor die, such that the voltage across any individual semiconductor die is less than that which the die is able to withstand.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 1:
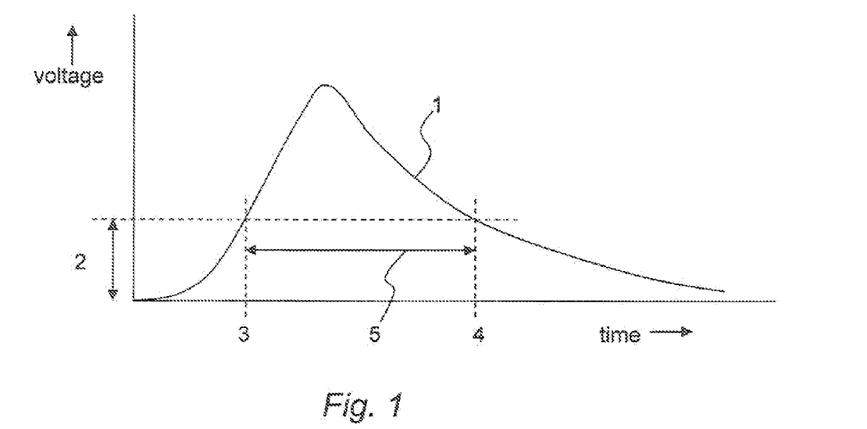
FIG. 1 illustrates a voltage profile corresponding to a typical surge or transient in a supply voltage.

FIG. 1 shows a voltage profile corresponding to a typical surge or transient in a supply voltage. It will be appreciated that parts of the x-axis have been expanded, since typically the voltage rises in about 1.2 μs and drops over several hundreds of μs. When the voltage level exceeds a normal voltage range 2 (e.g. 400Vdc), at a moment 3, a surge protection action such as opening a switch, is undertaken. The switch remains open for the period of the voltage surge, that is to say during period 5 whilst the voltage exceeds the normal voltage range, and when the voltage returns to within the normal voltage range, at the moment 4, the surge protection action is concluded—so in this example, the switch is shut.

Figure 2:
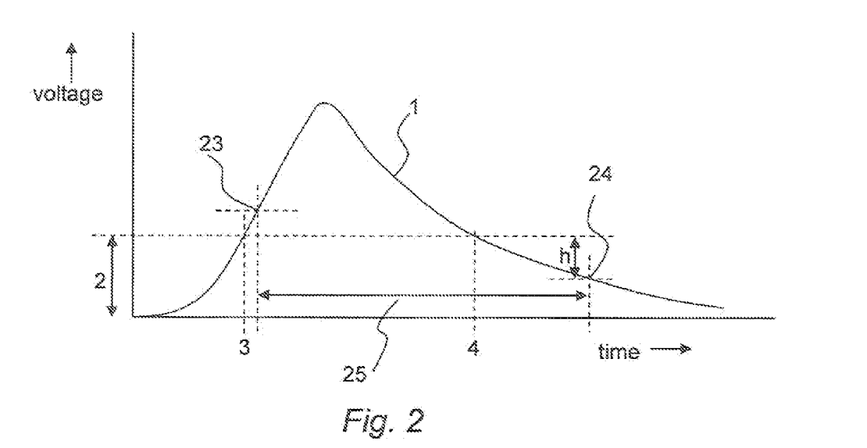
FIG. 2 illustrates the same voltage profile as in FIG. 1, and is includes timing indications for an example surge detection circuit.

In FIG. 2 is shown a more sophisticated response to the same voltage transient 1; in this case, although surge protection response is initiated at the moment 3 when the voltage exceeds the normal voltage range 2, there will be a certain response action delay, due to the reaction time of the comparator, switch drivers etc., such that the response is not effective until moment 23. Care must be taken that no overvoltage situation occurs due to this delay. Also, the surge protection response is not concluded at the moment 4 when the voltage returns to the normal voltage range, but is concluded at a later moment 24. The moment 24 is chosen to correspond to a time when the voltage has fallen back to a level such that the voltage at moment 24 differs from the voltage at the moment 3 by a voltage difference h. In the case of an embodiment of the invention as described below comprising two die, the moment 24 should be chosen to correspond to a time when the voltage has fallen back to a level which is at most half that of the moment 23; similarly, for a three die embodiment, the voltage at moment 24 should be less than one third that at moment 23. This arrangement ensures that there is a hysteresis in the system such that no bouncing occurs.

Figure 3:
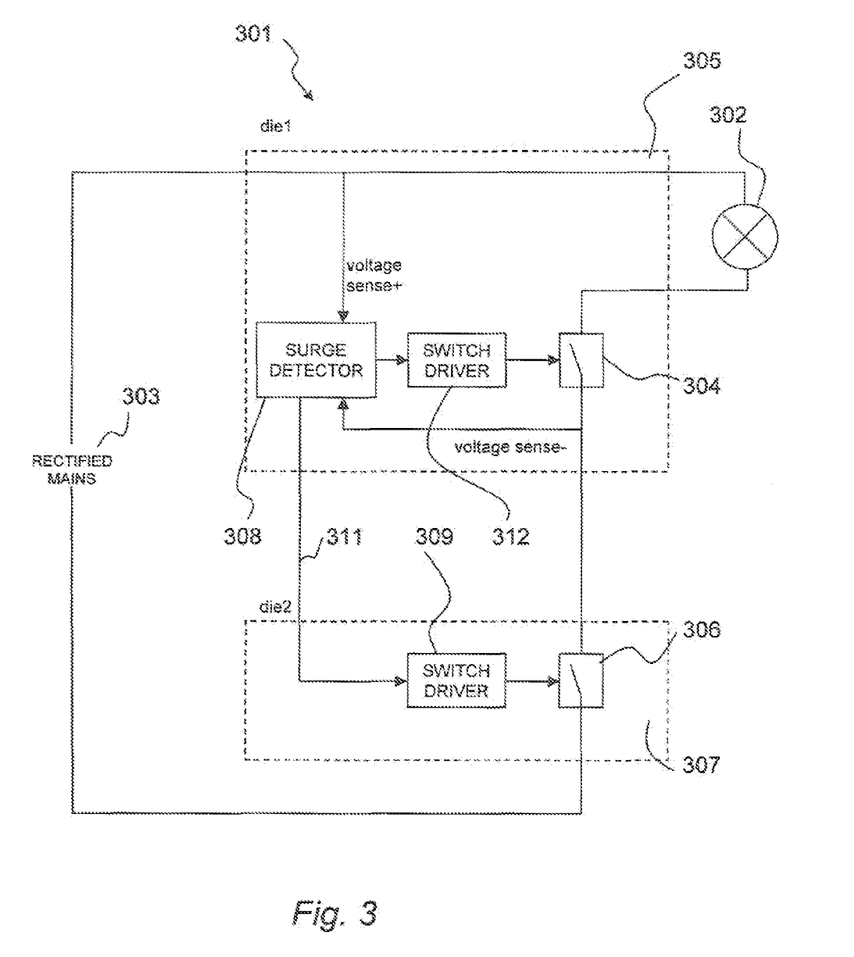
FIG. 3 shows a schematic of a surge protection at circuit integrated into a load directly driven from a rectified mains supply.

A first embodiment of the present invention is shown in FIG. 3. The figure shows a surge protection circuit 301 for a LED load 302, which is directly connected to a rectified mains supply 303. Thus the LED load 302 and the rectified mains supply 303 do not form part of the surge protection circuit. The circuit comprises a first switch 304 on a semiconductor die 305, and a second switch 306 on a second semiconductor die 307. In addition to first switch 304, first semiconductor die 305 also comprises a surge detector 308, and a switch driver 312 between the surge detection 308 and first switch 304. In the example shown the surge detector operates by detecting a surge in the voltage; surge detection by means of detecting a surge in the current is also possible. The surge detector is connected by communication means 311 to a switch driver 309 which forms part of the second die 307. Communication means 311 may be a simple wire link forming a galvanic or voltage communication means; however, it may equally be a different form of communication means such as optical communication or inductive communication, such as will be described in more detail hereunder. The switch remains open for the period where the voltage is larger than the threshold voltage or inside the hysteresis window, that is to say during period 25.

In operation, the surge detector 308 detects a voltage which exceeds the normal voltage range 2 of the supply. The surge detector opens switch 304 by means of the switch driver 312 on the same semiconductor die; furthermore, it also communicates with the switch driver 309 on the second semiconductor die 307 by means of communication means 311. Switch driver 309 operates to open switch 306 on the second semiconductor die 307. Thus, when the surge detector 308 detects the start of any surge in the supply, both switch 304, and switch 306 are opened. This means that the circuit is broken on both semiconductor die: as a result, the voltage during the power surge is distributed almost equally between the two semiconductor die, provided that the capacitance and leakage current of each of them are almost equal: it is a matter of design to ensure that this is the case.

Further, each die connection should be clamped with additional clamping diodes (not shown) to make sure that the voltage on those nodes remains within the voltage capabilities of the die. To ensure effective clamping, a series resistor (not shown), may be included with each clamping diode (also not shown). The clamping diodes connect the die connection to the respective die substrate, as will be immediately appreciated by the skilled person.

As an alternative to the voltage coupling mentioned above, optical coupling may be used. In order to implement optical coupling, a light emitting device (e.g. very small, ultra low power LED) may be incorporated with the encapsulated die. This device is driven by die1 305 in correspondence to the surge detection, so that light is emitted when a surge is detected. The other die2 307 (or each of them, for embodiments having more than two die, as will be described hereunder) has a light responsive device (e.g. photodiode) and responds to this light by switching off switch 306. Only one or several (short) pulses of light can be generated, because little current can be drawn from the supply during that part of the surge when the voltage is larger than normal (to prevent excessive dissipation). Several pulses of light can be used to reduce susceptibility to noise and improve robustness. Note that the package of the die (including light emitting and detecting devices) should be optically shielded, to prevent external light entering the package. Also the other parts (in particular the transistors and diodes) of the die may require to be shielded from the light such that the emitted light does not influence their behaviour.

As a further non-limiting alternative to voltage coupling, inductive coupling may be used: to implement this, die1 305 may contain a small (on-chip) inductor which generates a small magnetic field when a surge is detected. As die2 307 is very close to this (<1 cm distance), it can pick up this field with another inductor and switch of its switch 306. To improve robustness and decrease noise susceptibility, a pulse train with a certain frequency (fingerprint) should be generated. It may not be appropriate to rely on a dc field, due to the Earth's magnetic field. Equivalents, adaptations and variants will be readily apparent suitable for embodiments having multiple, daisy-chained die, such as providing different fingerprints for each die, although it will be appreciated that since the communication between die does not require to be specific between neighbouring die, it is not a requirement that the switch driver on each die need be uniquely triggered by a neighbouring die.

Figure 4:
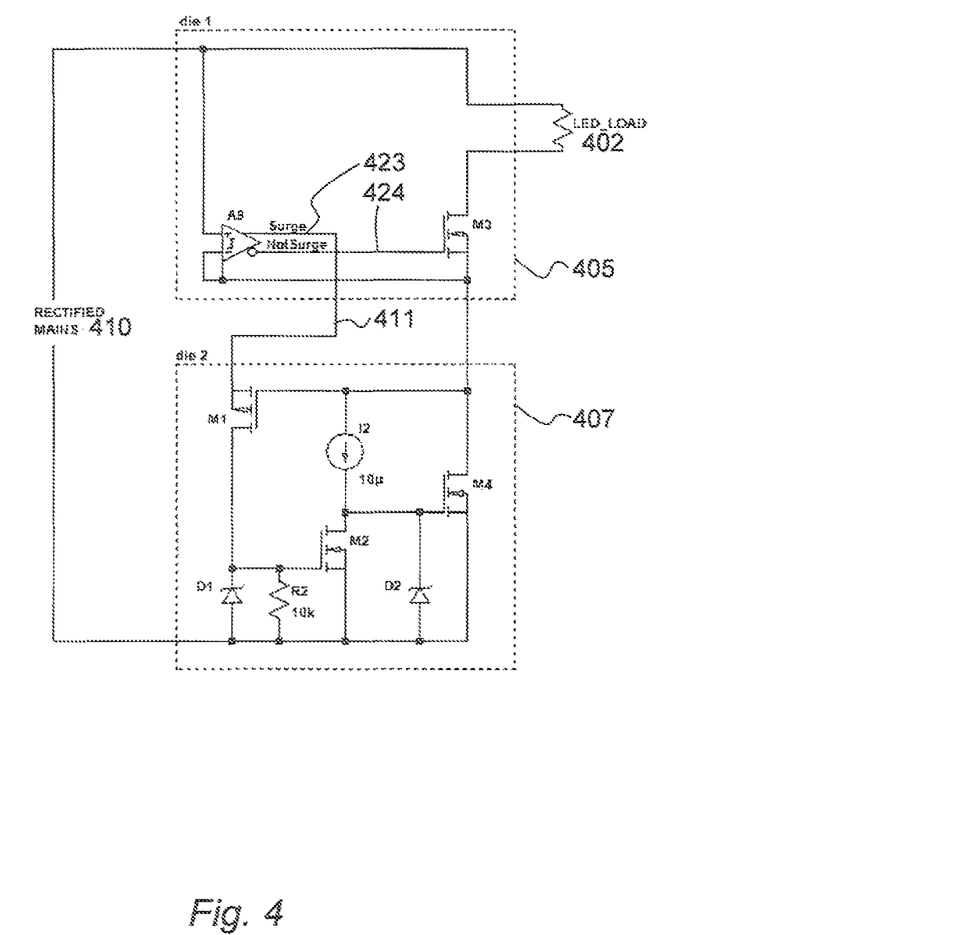
FIG. 4 shows an example circuit which implements the schematic of FIG. 3.

FIG. 4 shows a circuit diagram of a surge protector which implements the embodiment of FIG. 3. In this embodiment, the LED load 402 is connected in series with a first switch M3 on the first semiconductor die 405, which in turn is connected in series with a second semiconductor switch M4 on second semiconductor die 407. The voltage comparator A9 comprises the surge detector. Voltage comparator A9 produces outputs 423 and 424 designating the surge condition and not-surge condition respectively. Notsurge output 424 is connected to the gate of transistor M3; surge output 423 is connected to the second semiconductor die 407 by means of link 411 and transistor M1 which forms part of a cascode.

In this embodiment, link 411 is a simple wire or galvanic link; transistor M1 is located on second semiconductor die 407, connected as a source follower, and arranged along with M2 and current generator 12 to comprise a cascode. When no surge is present, and thus M1 is not conducting, resistor R2 pulls down the gate of transistor M2 to make it non-conducting. As a result, the capacitance on the gate node of transistor M4 (which capacitance comprises at least the drain-source capacitance of transistor M2 and the gate-source capacitance of transistor M4), is charged by current source 11, where clamping diode D2 limits the voltage on this gate node. Similarly, diode D1 clamps the voltage of the gate node of transistor M2 when transistor M1 is conducting. In operation, when voltage comparator A9 detects a voltage surge it communicates this by means of link 411 to the transistor M1 on the second semiconductor die. The cascode comprising M1, M2 and 12 buffers the signal from die 1 and converts it into a suitable voltage level for second switch M4: M1 starts conducting, the gate of M2 is pulled up, so M2 also starts conducting, and so the gate of M4 is pulled down and consequently, M4 is turned off. M2 is quickly enabled when a surge is detected, and as a result has the function of speeding up the processing of disabling M4.

Figure 5:
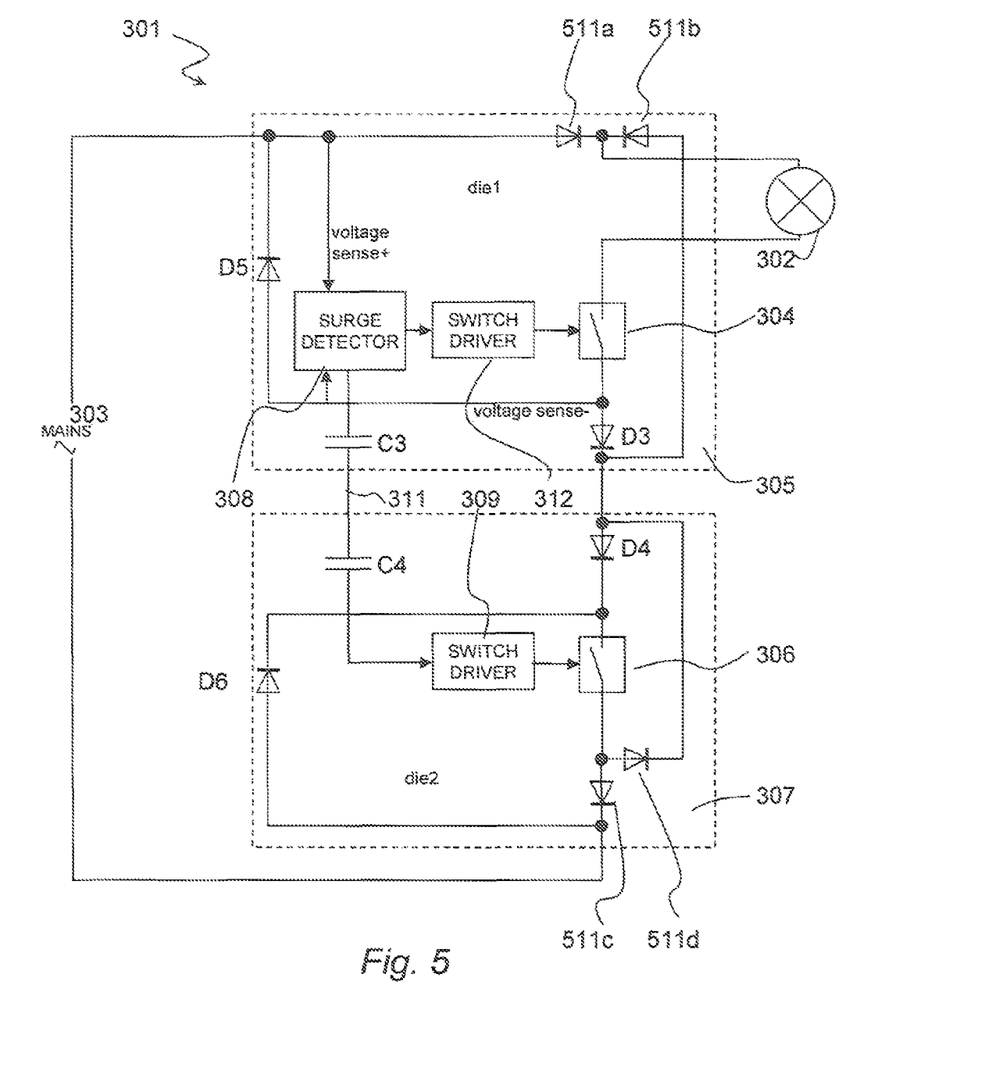
FIG. 5 shows a schematic of an embodiment of the invention operable with an un-rectified mains supply, incorporating clamping at the edge of the semiconductor die.

A further embodiment of the invention is illustrated in FIG. 5. FIG. 5 shows an improved version of the embodiment of FIG. 3, in which the bridge rectifier is integrated into the device. Relative to FIG. 3, like reference numerals correspond to like components, and like components perform the same function. However, here the bridge rectifier is distributed between the two die: that is, each die requires four rectifying diodes for full rectification of the mains voltage: diodes 511a, 511b, D3 and D5 on the first semiconductor die 305, and diodes 511c, 511d D4 and D6 on the second semiconductor die 307.

The other main difference between this embodiment and that is described FIG. 3 is the capacitive coupling of the semiconductor die. Capacitors C3 and C4 are connected in series with the inter-die link 311; C3 is located on the first semiconductor die 305, and C4 on the second semiconductor die 307. Capacitors C3 and C4 differentiate the voltage signal of the surge detector, thereby removing any DC voltage level.

As for the first die, the die connection nodes of the second die should be limited in voltage by clamping diodes (not shown).

In this embodiment, it is beneficial that the diodes which form the bridge rectifier are distributed evenly and symmetrically over the multiple die, having an equal number of diodes in both directions of the current. Furthermore, the signal paths via the diodes depend on the direction of the input voltage. As a result, the high and low side position of both die alternates within each mains cycle.

The communication between the die shown in FIG. 5 is based on a pulse based capacitive coupling. That is to say, a single pulse is generated when a surge voltage is detected. In a noisy environment, this could lead to a fault situation, in which the active die, that is to say the die which drives the LEDs, did not see a surge but the others do switch off because of noise on the communication line. In an improved embodiment, a level-based communication is used rather than the pulse-based system described above. To implement this with capacitive coupling, the surge detector should not generate a single pulse but rather a continuous train of pulses. Thus the surge detector enables an oscillator, when the surge condition is met. By introducing a narrow band filter at the correct frequency the other one or more die detects these pulses and implements a decision to switch off. This greatly improves the robustness of the communication, albeit at the expense of the time required to determine several of the pulses in order to ensure that it is a real signal which is being detected, rather than just noise from the system. It will be immediately appreciated that such pulse based communication is not limited only to capacitive coupling, but can be applied to other types of coupling, such as inductive of optical coupling.

Figure 7:
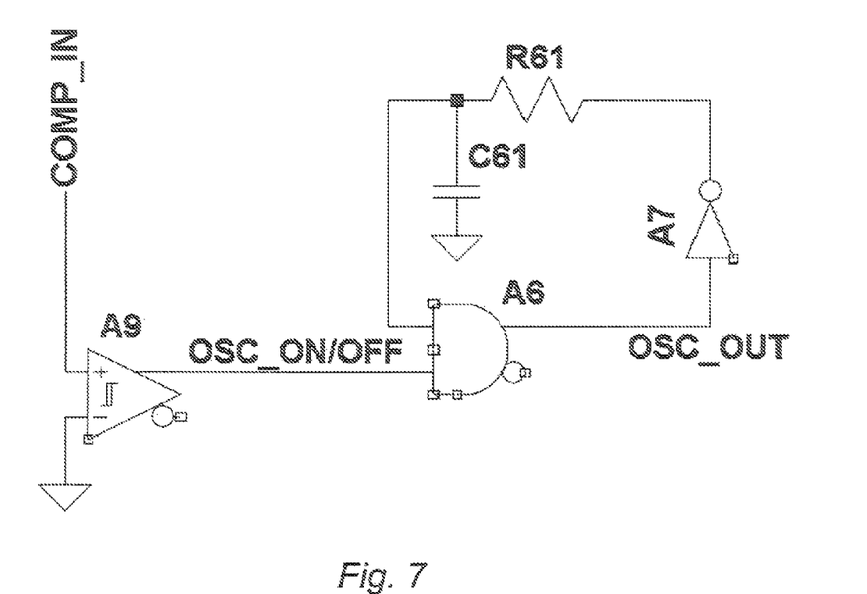
FIG. 7 shows a schematic circuit diagram of an oscillator suitable for capacitive coupling of two die.
Figure 8:
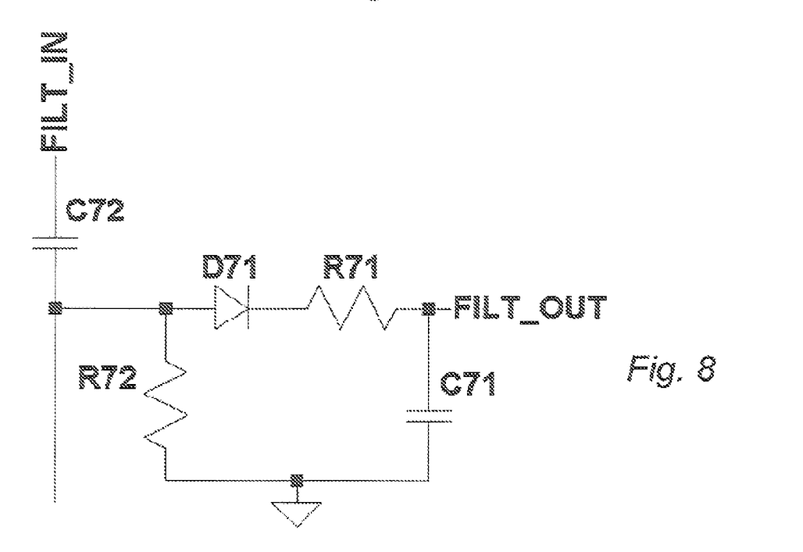
FIG. 8 shows a schematic circuit diagram of a narrowband filter for use in conjunction with the oscillator of FIG. 7.

Circuits which are suitable to act as oscillators and narrow band filters in accordance with this embodiment will be readily apparent to the skilled person; an example of such an oscillator is shown in FIG. 7, and an example of such a narrowband filter is shown in FIG. 8.

The oscillator of FIG. 7 includes components A6, A7, R61 and C61. The surge detector A9 turns it on/off, as indicated by node OSC_ON/OFF. It comprises a NAND logic A6 and INVERTOR A7 connected such that the output of the NAND cannot be stable with a high input from A9, at the OSC_ON/OFF node. The output of the oscillator is indicated at OSC_OUT.

Similarly, an exemplary narrowband filter includes components C72, R71, D71, R72 and C72, as shown in FIG. 8. The input of this filter is indicated by FILT_IN, and is connected to output FILT_OUT, by means of capacitor C72 which is grounded by resistor R72, in series with series-connected diode D71 and resistor; the output FILT_OUT is grounded by means of capacitor C71. When voltage across C71 (FILT_OUT) has risen sufficiently (so sufficient pulses have been detected), switch S3 goes into conduction.

Figure 6:
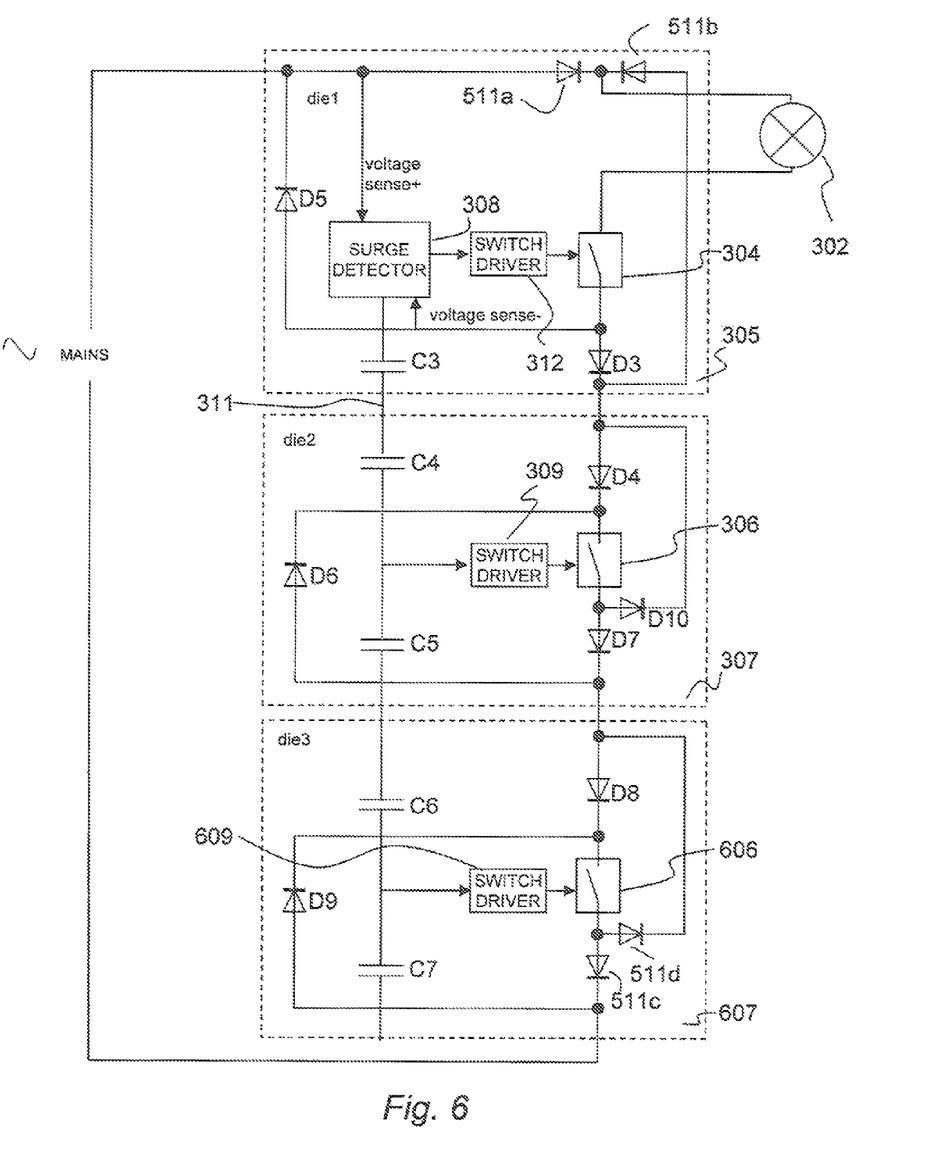
FIG. 6 shows a schematic of a further embodiment of the invention utilising more than two semiconductor die.

A further embodiment of the present invention is shown in FIG. 6. In overview, this embodiment is similar to that shown in FIG. 5; however, this embodiment extends the surge protection circuit to a third semiconductor die 607. Like components which carry out the same functions as those for the embodiment of FIG. 5 are given like reference numerals. Third semiconductor die 607 includes a switch driver 609, which drives a third switch 606, in a similar way to the arrangement of the second semiconductor die 307. Switch driver 609 is operable to control third switch 606, which isolates the third die 607 from the remainder of the circuit. Further capacitor C6 capacitively couples the second and third semiconductor die to each other, forming a daisy chained network of die. In this embodiment, capacitor C7 does not serve any purpose in a 3 die solution, but is available to connect a fourth die. It is thus present for scalability reasons. Although alternative networks or die are possible, such as a star network in which all other die are connected directly to the first one, a daisy chain is the preferred network in this application, since it avoids the creation of a capacitive imbalance between the die: such an imbalance would in turn create an imbalance in the spread of the surge voltage, which is undesirable, it being preferable to equally distribute the voltage across all the die, in order to minimise the highest voltage seen by any one of the die.

In addition to communicating with switch drivers 309 and 312, surge detector 308 communicates with switch driver 609, in order to protect all the semiconductor die 607 by opening switches 304, 306 and 606, in the event that surge detector 308 detects a surge in the supply voltage.

In this embodiment, diodes (for instance D4, D6, D7 and D10 on the second daisy-chained die) are required to guide the current in the correct path through all 3 switches in both directions of the current. Also, it is beneficial that these diodes are distributed evenly and symmetrically with respect to the other dies. Furthermore, the current paths through the die depends on the polarity of the input voltage. As a result, the high and low side position of top and bottom die alternates within each main cycle.

It will be immediately apparent to the skilled person that the embodiment of FIG. 6 can be readily extended to a fourth or more die in order to increase the surge protection voltage capability. The greater the number of die which are included in the circuit, the smaller is the fraction of the total peak surge voltage which results across each of the die and therefore the higher the surge protection voltage capability.

In a further embodiment, each semiconductor die includes a separate surge detector and switch. The surge detector on each semiconductor die operates to open the switch upon the detection of a surge in either current voltage. Since each die as its own surge detector, there is no requirement in this embodiment for any communication means between the separate die. Thus the surge detection may be considered to be distributed across the die.

The surge detectors on the individual die preferably detects the current. Using a current detector per die is more complicated, because the rise time of the current is faster than that of the voltage (typically around 200 ns rather than around 1 µs). It can also be done with a comparator, which monitors the current, and interprets too high a current to mean a surge, so that the switches must be turned off. Hysteresis is no use in this embodiment, because the current always drops to zero, making detection of the end of the surge impossible. Instead, a certain delay may be defined which would be expected to greatly exceed the duration of the surge (the time should be chosen to be significantly longer than 200 µs, which is the typical duration of a surge; thus 400 µs, or 1 ms may be chosen, for instance). After the delay the switches can be slowly turned on. Should the current still rise to unacceptable levels, the surge is apparently not over, or another surge is in progress. This way, additional zener diodes are required parallel over each die to limit the maximum voltage. One example of how the delay may be created, is to rely on the leakage current of one of the active devices on the die.

Action to isolate the die should be taken only after a defined minimum wait time or delay time, to make sure that all dies are able to detect the surge. Otherwise, it might be possible for the surge detector on one die to detect the surge and isolate the die before the surge detectors on the other die were able to identify a surge, and thus preventing the surge detectors from initiating action to isolate those die.

The embodiments above have been described in relation to a load which comprises LEDs directly driven from a mains supply. However the invention is not limited to this type of the load. In particular, it will be immediately apparent to the skilled person that the invention is widely applicable to systems in particular, which exhibit several of the following characteristics: firstly, a low inrush current; secondly, a low power or low current application; certainly, applications where the driver input and output voltage are fairly close to each other; fourthly, applications where it is not required to provide mains isolation; and fifthly, applications where it is undesirable to include a buffer capacitor since such a capacitor, which is typically an electrolytic capacitor, would negate the requirement for such a surge protection scheme. Moreover, the invention is not constrained to systems which run off a mains supply: in particular, the invention may beneficially be used in conjunction with alternative power supplies such as automotive applications, or portable generators providing a 24V supply for portable equipment, more particularly so where such alternative power supplies are susceptible to power surges due to, for instance the starting or interruption of inductive loads such as motors.

From reading the present disclosure, other variations and modifications will be apparent to the skilled person. Such variations and modifications may involve equivalent and other features which are already known in the art of surge protection circuits, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

From the above, it will be apparent that a surge protection circuit is disclosed for an electrical load which may be for instance an LED or OLED load which is directly connected to a supply such as mains supply, and comprises a plurality of switches which are distributed across a plurality of semiconductor die. A surge detector detects the start of a spike in the supply, which results from, for example the commencement or interruption of a nearby inductive load, and opens all the switches. By distributing the switches across multiple die the peak voltage across each is reduced relative to using a single die; thereby each die can stay within the absolute maximum voltage capacity.

Each die may have its own surge detector; alternatively, a single surge detector may be used which communicates with the switches on each of the die.

In an extension the bridge rectifier may be integrated into the circuit distributed across the die. In this embodiment additional inter-die clamping diodes are required to prevent unsafe floating of the edge connections of each die.

The invention claimed is:

1. A surge protection circuit for an electrical load directly connected to a supply susceptible to power transients operating at substantially a supply voltage, comprising
a plurality of switches connected in series, being connectable in use with the electrical load and the supply, and including
a first switch on a first semiconductor die and connectable, in use, in series with the electrical load,
and a second switch on a second semiconductor die,
the surge protection circuit further comprising
a surge detector on at least one of the first and the second semiconductor dies for detecting a surge in the supply,
a first switch driver being connected to the surge detector to open the first switch when the surge detector detects the surge in the supply, and
a second switch driver being also connected to the surge detector to open the second switch when the surge detector detects the surge in the supply.

2. A surge protection circuit according to claim 1, wherein the electrical load is an LED load.

3. A surge protection circuit according to claim 1, wherein the supply is a mains supply.

4. A surge protection circuit according to claim 1, wherein the surge detector comprises an element for introducing hysteresis between a detection of a surge start and a detection of a surge end.

5. A surge protection circuit according to claim 1, further comprising a connector for providing electrical connection between the first and second semiconductor dies, and diodes on each of the first and second semiconductor dies.

6. A surge protection circuit according to claim 1, wherein the surge detector is configured to detect a surge in current.

7. A surge protection circuit according to claim 1, wherein the surge detector is on the first semiconductor die, and further comprising a communicator for communicating between the surge detector and the second semiconductor die.

8. A surge protection circuit according to claim 7, wherein the communicator comprises a voltage coupling.

9. A surge protection circuit according to claim 8, wherein the communicator comprises at least one of a cascode device.

10. A surge protection circuit according to claim 7, wherein the communicator is pulsed-based and comprises at least one pulse.

11. A surge protection circuit according to claim 7, wherein the surge detector is configured to detect a surge in voltage.

12. A surge protection circuit according to claim 1, wherein the supply is a rectified mains supply.

13. A surge protection circuit according to claim 1, wherein the supply is a un-rectified mains supply, and further comprising a bridge rectifier for rectifying the mains voltage and integrated across at least the first semiconductor die and the second semiconductor die.

14. A surge protection circuit according to claim 13, wherein the bridge rectifier comprises a full bridge rectifier on each of the first and second semiconductor dies, connected in series, the full bridge rectifiers defining a first pair and a second pair of rectified terminals respectively, the second switch being connected between the second pair of rectified terminals, and the first switch being connectable, in use, in series with the load between the first pair of rectified terminals.

15. A surge protection circuit according to claim 1, wherein the first switch and the second switch are MOSFETs.

16. A surge protection circuit according to claim 1, wherein the plurality of switches further comprises at least one further switch, on a respective at least one further semiconductor die and connectable in use between the second switch and the supply.

17. A surge protection circuit according to claim 16, further comprising a bridge rectifier, wherein the bridge rectifier comprises a full bridge rectifier on at least one of the further semiconductor dies.

18. A surge protection circuit according to claim 16, further comprising a further surge detector on each of the at least one further semiconductor dies and wherein the at least one further switch is responsive to the respective further surge detector.

19. A surge protection circuit according to claim 16, further comprising a communicating element for communicating between the surge detector and the at least one further die.

* * * * *